Patented Apr. 17, 1934                                                            1,955,229

UNITED STATES PATENT OFFICE 1,955,229

PROCESS FOR THE MANUFACTURE OF
ALKALI METAL CYANIDES

Julius Drucker, Leverkusen-on-the-Rhine, Paul
Lueg, Leverkusen-Wiesdorf-on-the-Rhine, and
Paul Weise, Leverkusen-on-the-Rhine, Germany, assignors to I. G. Farbenindustrie Aktiengesellschaft, Frankfort-on-the-Main, Germany No Drawing. Application June 8, 1933, Serial No.
674,943. In Germany September 22, 1926

6 Claims. (Cl. 23—79)

The present invention relates to a process for the manufacture of alkali metal cyanides from alkali metal hydroxides or oxides or salts of alkali metals by means of ammonia and carbon monoxide.

The manufacture of alkali metal cyanides from alkalies, carbon and nitrogen or compounds thereof, such as ammonia, on a technical scale is attended with considerable difficulties on account of the fact that extremely high temperatures, such as 815° to 1100° C., are necessary for effecting this reaction. The attainment of the temperatures in question by external heating (this alone can be considered on account of the extraordinary reactivity of the cyanides in question) is extraordinarily unfavorable as regards heat economy and is moreover accompanied by a disproportionally large deterioration of the furnace and reaction vessel. Furthermore, the presence of carbon in the reaction mixture leads to a decomposition of ammonia, when this is used as nitrogen compound whereby a reduction of the yield of cyanide is obtained. Since on exceeding these temperatures the alkalies or the alkali metal cyanides already volatilize to a marked extent, these methods are now scarcely applied on a technical scale.

In accordance with the present invention an excess mixture of gaseous ammonia and carbon monoxide is led over an alkali metal hydroxide or oxide or a suitable salt of an alkali metal, for example, sodium carbonate, sodium sulfide, sodium or potassium sulfate, sodium formate, sodium acetate or the like, at about 580° to about 650° C. in the absence of solid carbon, whereupon the formation of cyanide occurs in a surprisingly smooth manner accompanied by the simultaneous separation of hydrogen and water vapor in case alkali metal hydroxides are used as starting material or other gaseous reaction products when other alkali metal salts are used, for instance, hydrogen sulfide, hydrogen and water when sulfides or sulfates are used, or carbonic acid and hydrogen and water when carbonate or organic salts are used. The alkali metal salts of hydrochloric acid and silicic acid have been found to be inoperative. The gas mixture is caused to act on the alkali metal compound until the content of the gaseous reaction product has reached a maximum, dependent upon the temperature employed and the partial pressures of the ammonia and the carbon monoxide. Obviously the excess of the gas mixture can be used again, after the removal of the gaseous reaction product either by cooling, adsorption or by chemical means. Depending on the concentration of the gases the same may be applied either at atmospheric pressure or at higher pressures. The process may be effected in the solid as well as in the melted state. When working with melted initial materials, it is advantageous to add to the alkali metal compound an ingredient lowering the melting point of the alkali metal compound used as alkali metal cyanide. In order to increase the surface of the alkali metal compound and to protect the walls of the reaction chamber and the furnace, the alkali metal compound may be incorporated with some indifferent filler or diluent, such as magnesium oxide, and in this way agglomeration or caking of the mass is effectively prevented. When working in this preferred manner, the alkali metal cyanide produced is recovered by lixiviation and evaporation of the solution, while the filler is returned to the process for re-use.

The following table shows that according to the new process a much better yield of cyanide is obtained on account of the nitrogen than in the old process using solid carbon as initial material and using temperatures of at least 815° C.

|  | Test I | Test II |
|---|---|---|
| Reaction: | | |
| Temperature | 815° C | 600° C. |
| Duration (minutes) | 180 | 180. |
| Initial melt | 5.6 grams KOH. 1.3 grams C (Wood charcoal). | 5.6 grams KOH. |
| Initial gas | 30 liters $NH_3$ 5 liters CO | 30 liters $NH_3$. 70 liters CO. |
| Product obtained (¹) | 6.3 grams KCN 0.7 grams C | 6.2 grams KCN. |
| Constitution of the used gas. | 21.6 liters $NH_3$ 1.4 liters CO 1.2 liters $H_2O$ 11.4 liters $H_2$ 2.4 liters $CO_2$ 3 liters $N_2$ | 27.6 liters NH. 65.2 liters CO. 2.4 liters $H_2O$. 2.4 liters $H_2$. 2.4 liters $CO_2$. |
| Yield of nitrogen a gr. (²). | 28 | 96. |

¹ Residue: Cyanate (KCNO).
² From 100 grams of transformed and decomposed ammonia a gram ammonia was bound as cyanide.

The following examples will serve to illustrate our invention:

*Example 1.*—A current of gas consisting of 35 per cent by volume of ammonia and 65 per cent by volume of carbon monoxide is led over 50 parts of magnesium oxide and 50 parts of sodium hydroxide at about 500° C. until the gas contains 100 grams of water per cubic meter. When the reaction is complete, the melt is lixiviated and the cyanide worked up in a known manner, while the gases are returned to the process after the separation of the water vapor.

*Example 2.*—Ammonia gas which has been saturated at 40° C. with methyl alcohol is passed through a well agitated melt of 25 parts by weight of sodium cyanide and 75 parts by weight of sodium carbonate at about 600° C. In this way the carbonate is converted into cyanide with the simultaneous formation and evolution of hydrogen and carbondioxide. The cyanide formed can be freed from any cyanate produced in any known manner.

*Example 3.*—A gas mixture of 65 per cent by volume of CO and 35 per cent by volume of $NH_3$ is passed through a melt of 5.3 grams of sodium carbonate and 1.1 grams of sodium cyanide at a velocity of 25 liters per hour and at a temperature of 620° C. for 4 hours. The gas escaping contains on the average 61.4 per cent by volume of CO, 32.6 per cent by volume of $NH_3$, 2.4 per cent of volume of $H_2O$, 1.2 per cent by volume of $H_2$, 2.4 per cent by volume of $CO_2$, the final melt contains 93 per cent of NaCN and 7 per cent of NaCNO.

*Example 4.*—A mixture of 14 liters of carbon monoxide and 7 liters of ammonia is passed in a circuit through a melt of 5.3 grams of sodium carbonate and 1.1 gram of sodium cyanide for 6 hours at 620° C. at a velocity of 25 liters per hour. The reaction gas is led over caustic soda every time after passing the melt in order to remove the carbon dioxide and the water vapor. After the reaction is complete, the gas mixture consists of 1.40 liters of $H_2$, 4.56 liters of $NH_3$, 10.40 liters of CO and 0.04 liters of $N_2$, the melt contains 92 per cent of NaCN and 8 per cent of NaCNO; the NaCNO content of the melt can be removed by treating the melt at 700° C. with pure carbon monoxide.

*Example 5.*—A mixture of 70 per cent by volume of CO and 30 per cent by volume of $NH_3$ is passed through a melt of 2000 kgs. of sodium carbonate and 400 kgs. of sodium cyanide at 620° C. and at a velocity of 800 cubic meters per hour. After the mixture has passed the melt, the carbonic acid formed is separated from the gas by cooling as ammonium-carbonate-carbamate. The water formed is likewise separated. In order to avoid an excessive concentration of hydrogen about 4 per cent of the reaction gas are blown off for other purposes. The remaining gas after the addition of ammonia and carbon monoxide is re-introduced into the melt until after about 60 hours the cyanization process is complete.

Before entering the melt the reaction gas is of the following medium composition: 60 per cent by volume of CO, 20 per cent by volume of $H_2$ and 20 per cent by volume of $NH_3$; on leaving the melt the composition is the following one: 57 per cent by volume of CO, 18 per cent by volume of $NH_3$, 2 per cent by volume of $CO_2$, 2 per cent by volume of $H_2O$, 21 per cent by volume of $H_2$. Finally a melt containing 92 per cent of NaCN and 8 per cent of NaCNO is obtained which is freed from the cyanate content in accordance with the directions of Example 4.

This is a continuation in part of our co-pending application for Letters Patent Serial No. 220,833, filed Sept. 20, 1927.

We claim:

1. The process for the manufacture of alkali metal cyanides, which comprises causing an excess mixture of ammonia and carbon monoxide to act on a compound of the group consisting of alkali metal oxides, hydroxides, carbonates, sulfides, sulfates, formates and acetates at a temperature of about 580–650° C. in the absence of solid carbon.

2. The process for the manufacture of alkali metal cyanides, which comprises causing an excess mixture of ammonia and carbon monoxide to act on a compound of the group consisting of the oxides, hydroxides and carbonates of sodium and potassium at a temperature of about 580–650° C. in the absence of solid carbon.

3. The process for the manufacture of sodium cyanide, which comprises causing an excess mixture of ammonia and carbon monoxide to act on sodium carbonate at a temperature of about 580–650° C. in the absence of solid carbon.

4. The process for the manufacture of alkali metal cyanides, which comprises causing an excess mixture of ammonia and carbon monoxide to act on a compound of the group consisting of alkali metal oxides, hydroxides, carbonates, sulfides, sulfates, formates and acetates at a temperature of about 580–650° C. in the absence of solid carbon, and re-introducing the excess gases into the process after purification.

5. The process for the manufacture of alkali metal cyanides, which comprises causing an excess mixture of ammonia and carbon monoxide to act on a compound of the group consisting of the oxides, hydroxides and carbonates of sodium and potassium at a temperature of about 580–650° C. in the absence of solid carbon, and re-introducing the excess gases into the process after purification.

6. The process for the manufacture of sodium cyanide, which comprises causing an excess mixture of ammonia and carbon monoxide to act on sodium carbonate at a temperature of about 580–650° C. in the absence of solid carbon, and re-introducing the excess gases into the process after purification.

JULIUS DRUCKER.
PAUL LUEG.
PAUL WEISE.